Aug. 29, 1950     H. C. DOHERTY     2,520,458
BALE CARRIER
Filed March 16, 1949
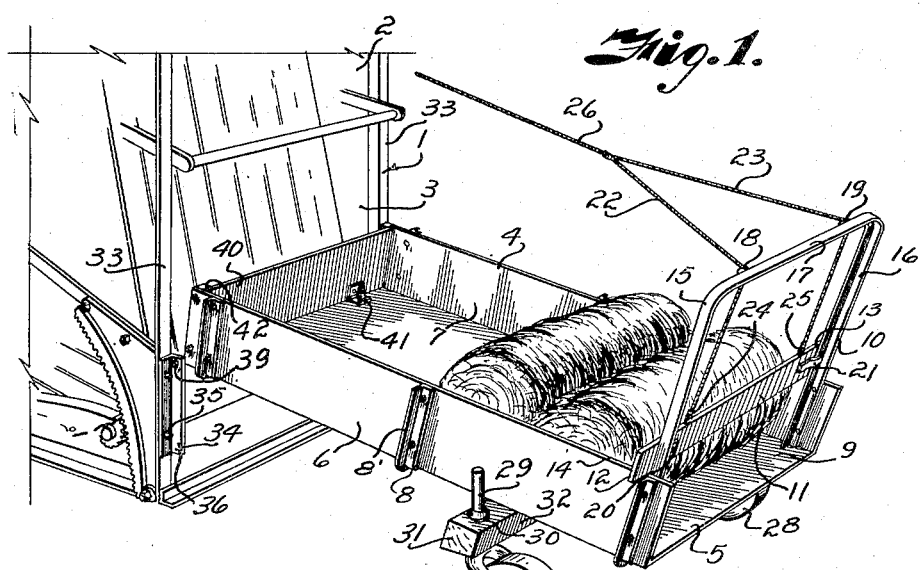
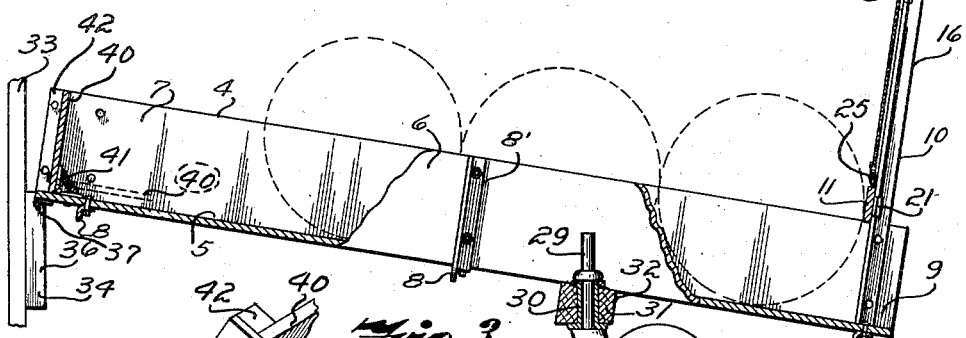
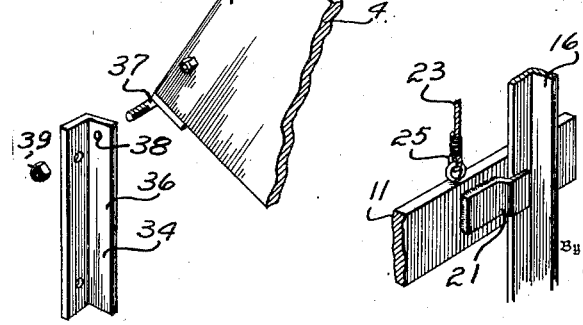
Inventor
Henry C. Doherty
By Fishburn & Mullendore
Attorneys Patented Aug. 29, 1950

2,520,458

UNITED STATES PATENT OFFICE 2,520,458

BALE CARRIER

Henry C. Doherty, Amorita, Okla.

Application March 16, 1949, Serial No. 81,722

7 Claims. (Cl. 298—6)

This invention relates to a bale carrier adapted for attachment to a baler of a hay harvesting machine of a type which is drawn over a field for gathering cut hay, straw or similar crop from windrows and in which the crop is automatically formed into bales and discharged onto the field. It is thus obvious that the bales are left scattered over the field and considerable time and labor is involved in collecting and hauling the bales from the field.

Therefore, the principal objects of the present invention are to provide such balers with a bale carrier that is adapted to be readily connected with the hay baler for receiving and carrying the bales as they are ejected from the machine and to provide for discharge of the bales from the carrier in piles where they are in convenient position to be hauled from the field.

Other objects of the invention are to provide a bale carrier that is capable of being attached without altering the structure of the baler, to provide the carrier with an inclined bottom whereon the bales automatically shift to the rear of the carrier as they are discharged from the baler and which subsequently facilitates discharge of the bales from the carrier; to provide a carrier that is semi-supported by the baler so that the major weight of the carrier and its load are free of the baler; to provide the carrier with a control member that prevents the carried bales from rolling back into the baler and interfering with subsequent bales when the machine is traveling down hill or across ravines; to provide the carrier with a simple bale discharge mechanism that is readily actuated by the operator of the tractor used in pulling the baler; and to provide the carrier with swivelly mounted supporting wheels to permit the carrier to follow the course of the baler.

In accomplishing these and other objects of the invention hereinafter pointed out, I have provided improved structure, the preferred form of which is illustrated in the accompanying drawing wherein:

Fig. 1 is a perspective view of a bale carrier that is constructed in accordance with the invention and showing the carrier attached to the bale discharge end of a conventional baling machine of the type described.

Fig. 2 is a longitudinal section through the carrier, a part of the near side being shown in elevation to show mounting of one of the swivel wheels, the bales being shown in dotted lines.

Fig. 3 is a perspective view showing one form of connection for coupling the carrier with a baler.

Fig. 4 is a perspective view showing the slide mounting of one end of the bale stop and discharge member.

Referring more in detail to the drawing:

1 designates a bale carrier constructed in accordance with the present invention and 2 the bale discharge end of a conventional baler wherein hay, straw, or the like is rolled into cylindrical bales, tied and ordinarily discharged through an opening 3 directly upon the ground but which, with the carrier attached is discharged into the carrier for transport therewith until a desired number of bales has been collected and a place reached to deposit the bales for subsequent removal from the field.

The bale carrier 1 is preferably in the form of a semi-trailer so as to reduce as much as possible the weight load and stresses upon the baler. The carrier therefore comprises a bed or body 4 having a bottom 5 and longitudinal side boards 6 and 7 spaced apart in accordance to the width of the discharge opening 3 so that the bales will roll from the discharge opening onto the bottom 5 to the rear thereof in successive order as shown in Fig. 1. The sides 6 and 7 may be suitably reinforced with the bottom by transverse sill members 8 having upstanding ends 8' to which the sides are attached, the sides being preferably only of a height to prevent lateral displacement of the bales. The bed or body may be of a length required to receive the number of bales which are to be collected and deposited therefrom through an open rear end 9 which is closed to discharge of the bales by a stop and discharge member 10. The member 10 preferably comprises a cross bar or board 11 having ends 12 and 13 normally resting upon the edges 14 of the side boards 6 and 7 and which extends across the bed in position to engage and stop the rearmost bail from being discharged from the carrier. The ends of the cross board bear slidably on standards 15 and 16 that are higher than the diameter of the bales so that the bales can be discharged under a cross tie bar 17 which interconnects their upper ends to mount pulleys 18 and 19. The ends of the cross bar 11 are retained in sliding contact with the standards by clips or lugs 20 and 21 (see Figs. 1 and 4) which are secured thereto for engaging a rear face of the standards. The cross bar is thus adapted to be raised upon the standards when desired by means of cables 22 and 23 that are connected with the ends of the cross bar as indicated at 24 and 25. The cables extend upwardly and over the respective pulleys 18 and 19 where they join with a single cable 26 leading forwardly to the operators position.

Since the carrier must follow the baler, the rear end is shown as being supported on caster wheels 27 and 28 having stems 29 swivelled in suitable bearings 30 that are carried in the projecting ends 31 of a cross member 32. The member 32 is suitably attached to the underside of the bottom 5 and the ends project beyond the side boards 6 and 7 to position the caster wheels sufficiently wide apart to give the desired stability.

The forward end of the bed may be connected with the baler in accordance with the structure of the baler frame, however, since the machine must move over unlevel ground a hinge connection must be provided on which the carrier is adapted to hinge on a transverse horizontal axis with respect to the baler frame. In the illustrated instance the vertical side members 33 of the baler frame at the respective sides of the opening 3 are provided with angle brackets 34 that are secured thereto by fastening devices such as bolts 35 in such manner that flanges 36 of the angle brackets are in parallel with the sides 6 and 7 of the carrier, and bed support trunnions 37 that are attached to the front bottom corners of the bed as shown in Fig. 3 and which extend laterally therefrom for pivoting movement in openings 38 that are provided in the upper ends of the flanges. If required, the trunnions may be provided on their outer ends with nuts 39.

In order that the bales will automatically roll to the rear of the bed, the bottom 3 slopes downward and rearwardly from the baler. This is effected in the illustrated form of the invention by the provision of relatively small caster wheels and suitable positioning of the attaching brackets 34 or the location of the openings 38 therein. While I have shown this arrangement, the bed may be formed with a sloping bottom if desired.

When the machine moves down hill there may be a tendency for the bales to roll forwardly into the baler and to prevent this occurrence, the carrier may be provided at its forward end with a trap gate 40 that extends transversely at the forward end of the bed and has its lower edge hinged to the bottom 5 by spring hinges 41 which normally support the gate in upright position as shown, but which allows the gate to yield under weight of an incoming bale from the baler. The gate is, however, supported rigidly against a return roll of the bale by stops 42 that are attached to the inner forward ends of the side boards.

Assuming that the carrier is assembled and attached to a baler as described, forward movement of the baler by its draft vehicle trails the carrier. When the baler turns from a straight-away path as at the ends of a field, the support wheels of the carrier swivel to permit the carrier to follow freely the baler. When the baler moves over uneven ground as when traveling up and down hill, the carrier hinges up and down by reason of its bracket connections therewith.

When a bale is discharged through the opening 3 of the baler it strikes the front side of the gate 40 which swings inwardly under weight of the bale and the bale rolls thereover and down the sloping bottom of the carrier to be stopped by the cross bar 11. As soon as the bale passes the trap gate 40, the spring hinges return the gate to its original position so that should the machine move down hill sufficiently steep to cause a forward roll of the bale it will not roll into the baling machine. Other bales, after being formed roll into the carrier in a similar manner as shown in the drawing. When a desired number of bales are in the carrier, they are discharged therefrom and roll into a pile. This is effected by the operator pulling upon the cable 26 and raising the cross bar 11 from detention position. As soon as the cross bar has raised sufficiently the first bale rolls thereunder and off the rear edge of the bottom 5 onto the ground followed by the other bales.

The operator then releases the cable and the bar drops into its original position to stop the next bale until a sufficient number of bales have accumulated to form another pile.

From the foregoing it is obvious that with my invention the bales instead of being scattered haphazardly over a field may be orderly deposited in piles with the piles arranged in rows so that they are readily hauled from the field with a minimum of time and labor.

What I claim and desire to secure by Letters Patent is:

1. A bale carrier adapted for attachment to a baler to receive and carry bales discharged from the baler including a bed having a rearwardly and downwardly sloping bottom, a stop member movably supported on said bed above the lower end of said bottom to retain bales that are discharged into said bed when the carrier is attached to a baler, means for moving said stop member to release said bales, and a trap gate at the front end of said bed to prevent rolling of said bales from off the higher end of said bottom when the carrier is moved down hill.

2. A bale carrier adapted for attachment to a baler to receive and carry bales discharged from the baler including a bed, a stop member movably supported on said bed to retain bales that are discharged into said bed when the carrier is attached to a baler, means for moving said stop member to release said bales, and a trap gate at the front end of said bed to prevent rolling of said bales from off the higher end of said bottom when the carrier is moved down hill.

3. A bale carrier adapted for attachment to a baler to receive and carry bales discharged from the baler including a bed having a rearwardly and downwardly sloping bottom and having sides for retaining said bales for rolling support on said bottom toward the rear end of said bed, a stop member movably supported at the rear of the bed to retain said bales, means for moving said stop member to release said bales, means for attaching said carrier to a baler, and a trap gate at the front end of said bed for preventing rolling of said bales out the front end of the bed when the carrier is moved down hill.

4. A bale carrier adapted for attachment to a baler for receiving and carrying bales discharged from the baler including a bed having a rearwardly and downwardly sloping bottom and sides for retaining said bales for rolling support on said bottom toward the rear end of said bed, a stop member movably supported at the rear of the bed to retain said bales, means for moving said stop member to release said bales, a caster wheel support for the rear end of said bed, and means for connecting the front end of the bed with the baler.

5. A bale carrier adapted for attachment to a baler to receive and carry bales discharged from the baler including a bed having a rearwardly and downwardly sloping bottom, standards at the respective sides of the bed, a cross bar extending between said sides and having ends slidably supported on said standards for engaging and retaining the bales in said bed, a cross member connecting the standards, pulleys on the cross member, a release cable having branches extending over said pulleys and connected with the cross member, caster wheels supporting the rear end of the bed, and means for hinging the front end of the bed with the baler.

6. A bale carrier adapted for attachment to a baler to receive and carry bales discharged from the baler including a bed having a rearwardly and downwardly sloping bottom, standards at the respective sides and at the rear end of the bed, a cross bar extending between said sides and having ends slidably supported on said standards for engaging and retaining the bales in said bed, a cross member connecting the standards, pulleys on the cross member, a release cable having branches extending over said pulleys and connected with the cross member, caster wheels supporting the rear end of the bed, means for hinging the front end of the bed with the baler, and a trap gate at the front end of said bed to prevent rolling of the bales out the front end of the bed when the carrier is moved down hill.

7. A bale carrier adapted for attachment to a baler to receive and carry bales discharged from the baler including a bed having a rearwardly and downwardly sloping bottom, a stop member movably supported on said bed above the lower end of said bottom to retain bales that are discharged into said bed when the carrier is attached to a baler, means for moving said stop member to release said bales, and a yieldable trap at the front end of said bed having yieldable mounting to permit entrance of said bales and returnable to a position for preventing roll of said bales from off the higher end of said bottom when the carrier is moving down hill.

HENRY C. DOHERTY.

REFERENCES CITED

The following references are of record in the file of this patent:

UNITED STATES PATENTS

| Number | Name | Date |
|---|---|---|
| 2,390,306 | Hunziker | Dec. 4, 1945 |
| 2,453,384 | Renken | Nov. 9, 1948 |
| 2,482,160 | Donogh | Sept. 20, 1949 |

FOREIGN PATENTS

| Number | Country | Date |
|---|---|---|
| 871,420 | France | 1942 |